(No Model.)  2 Sheets—Sheet 1.
S. B. HART.
GRAIN DRILL.
No. 344,272.  Patented June 22, 1886.
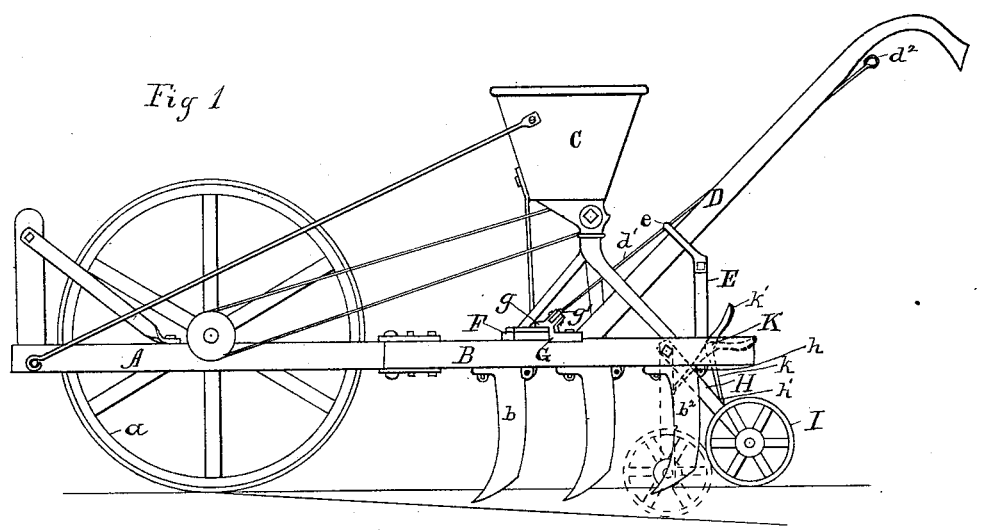
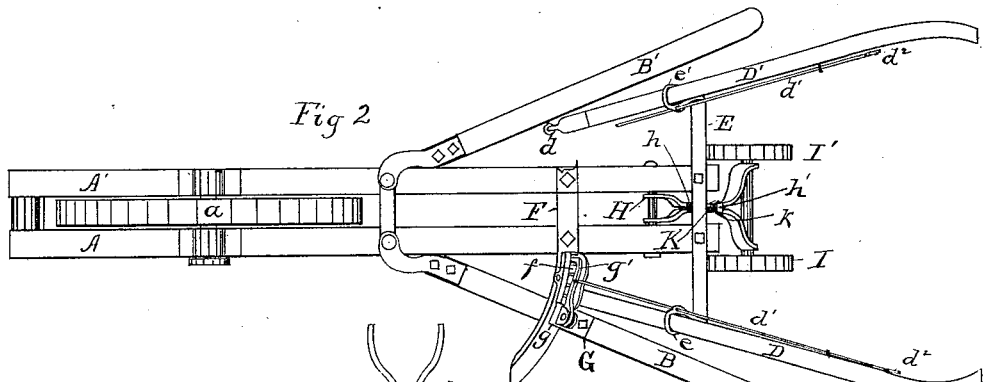
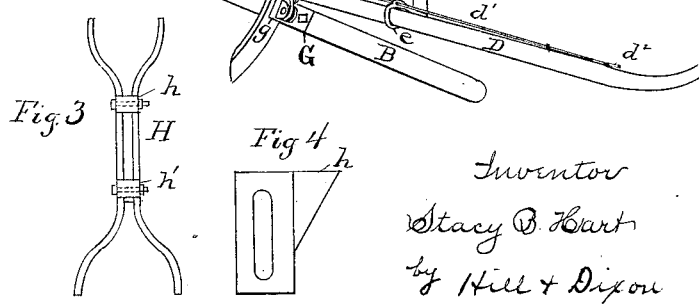
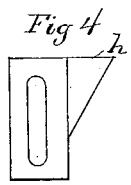
Witnesses
E. L. Thurston
W. C. Coe.
Inventor
Stacy B. Hart
by Hill & Dixon
his attorneys (No Model.)  2 Sheets—Sheet 2.
S. B. HART.
GRAIN DRILL.
No. 344,272.    Patented June 22, 1886.
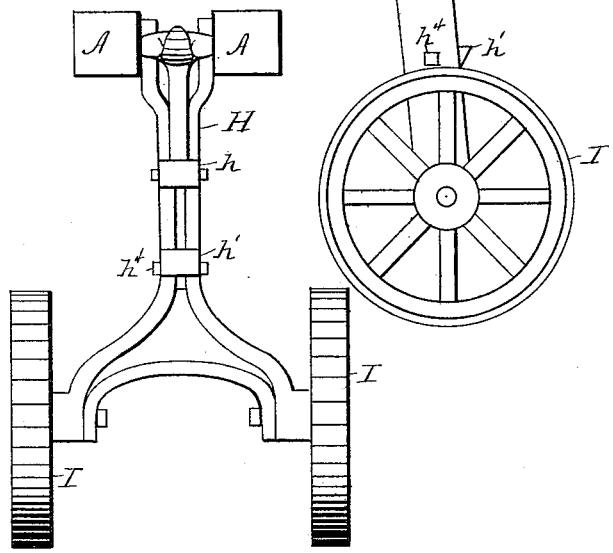
Witnesses
E. L. Thurston
Frank F. Douglas
Inventor
Stacy B. Hart
by Hill & Dixon
his attorneys

UNITED STATES PATENT OFFICE.

STACY B. HART, OF PEORIA, ILLINOIS.

GRAIN-DRILL.

SPECIFICATION forming part of Letters Patent No. 344,272, dated June 22, 1886.

Application filed November 17, 1885. Serial No. 183,142. (No model.)

*To all whom it may concern:*

Be it known that I, STACY B. HART, of Peoria, in the county of Peoria and State of Illinois, have invented certain new and useful Improvements in Grain-Drills, of which the following is a description, reference being had to the accompanying drawings, which are made a part of this specification.

The object of my invention is to provide means in a grain-drill whereby both the width and the depth of the planting can be quickly and easily regulated, and whereby the drill may be so arranged that in transporting it from place to place, or in turning it at the ends of the rows, the hoes shall be clear of the ground.

To this end my invention consists, first, in the combination, with the drill-frame, of an arm pivoted thereto having a wheel or wheels mounted on its free end, and a latch or other means for engaging with said arm to hold it in various positions, whereby the hoes are held wholly above the ground or permitted to enter the ground to any desired depth; and, second, in the combination, with the drill-frame and side bars, which bear the hoes, pivoted thereto, of the handles loosely connected with said wings and stationary guides or guide-rings, which act as fulcrums for said handles; and, also, in the various sub-combinations, herein fully described, and definitely pointed out in the claims.

In the drawings, Figure 1 is a side elevation of my improved grain-drill. Fig. 2 is a plan view of the same with the hopper and conductor-tubes removed, and a portion of the curved bar F cut away. Fig. 3 is a detached view of the arm H. Fig. 4 is a detached view of the shoulder $h'$. Figs. 5 and 6 are detailed views of the devices for raising the hoes above the ground, Fig. 5 being a side view, and Fig. 6 a rear view, of the same.

A A' represent the center bars or main frame of the drill, and C the seed-box or hopper secured thereto.

B B' represent side bars or wings, which are pivoted at their forward ends to the frame A A', and swing in a substantially horizontal plane, and the hoes $b\ b^2$, &c., are secured to said wings and connected with the hopper by any appropriate conductor-tubes.

$a$ represents the wheel which supports the forward end of the drill.

Near the rear end of the frame A A' a curved arm, E, is fastened, which has upon its ends the guide-rings $e\ e'$. This precise construction is not insisted upon, since the requirements of the invention are, that some stationary devices shall be provided which shall guide the handles in their motion and act at the same time as fulcrums for said handles when they are employed as levers, and any devices which perform this double function I regard as the equivalent of the guides herein described.

D D' represent handles, which pass through said guide-rings $e\ e'$, respectively, and are fastened at their lower ends to the wings B B', respectively, preferably by means of the staples or rings $d\ d$, which makes a loose connection between them.

If the handles D D', or either of them, be pushed inward, it is evident that the rings $e\ e'$ will act as fulcrums, and that the lower ends of the handles will thrust against the wings B B' and cause them to swing upon their pivots outward, and that thereby the width of the rows made by the hoes will be increased, and that a force in the opposite direction applied to the handles will produce a contrary motion in the wings, and thereby decrease the width of the rows.

It is desirable to have some means for fastening or latching the wings in any desired position, and also means for readily unlatching them to enable the operator to suddenly change the width of the rows, if desired. The preferable form for accomplishing this result I consider to be the construction shown in the drawings, wherein a curved bar, F, is shown to be fastened to the center bar A. Upon the upper faces of the wings B B' are bolted the plates G, each plate having integral therewith a curved arm, $g$, which extends over the upper face of the curved bar F, thereby serving to hold the wings in substantially the same plane, and relieve the pivots of much of the weight of said wings. To the plate G is pivoted the latch $g'$, having its free end turned downward, the said latch lying in substantially the direction of the bar F. Attached to the latches $g'$ are the rods $d'\ d'$, which extend along the handles D D', and have on their ends the finger-rings $d^2\ d^2$ within reach of the operator. Upon the upper face of the bar F are notches or depressions $f$, into which the end of the latch drops by its own weight when released, thereby retaining the wings B B' in a fixed relative position until the latch is lifted by means of the rod d'. Near the rear end of the center bars, A A', is pivoted an arm, H, which preferably has along its rear face the shoulders or notches h h'. On the free end of the arm H is mounted one or more (preferably two) wheels, I I'. The length of this arm H and height of the wheel together is such that when they hang straight down from the bar, or nearly so, the hoes b b', &c., are held free from the ground. Back of the pivotal point of the arm H a latch, K, is pivoted to said center bar A. This latch in its preferable form consists of two arms lying nearly at right angles to each other, the lower arm, k, being adapted to engage with the shoulders upon the arm H. The other arm, k', acts as a lever, by which the latch is disengaged from its connection with the arm H, and also acts as a weight, which forces the arm k forward, and holds it in constant contact with the arm H.

The notches or shoulders h h' are so arranged upon the arm H that when the latch K engages with the upper one, h, it holds the hoes wholly above the ground. When it engages with the lower shoulder, it permits the hoes to sink into the ground to the fullest extent designed; when with an intermediate notch, only partially into the ground.

In the preferable construction, as illustrated in the drawings, the arm H consists of two parts—flat bars—lying side by side, and the shoulders h h' are projections from pieces of iron fastened between said bars. The lower shoulder is a part of a slotted piece, $h^3$, and a bolt, $h^4$, passes through the said slot. This piece $h^3$ can be moved up and down, and bolted in the desired position, thereby regulating the depth which the hoes are permitted to sink into the ground.

The operation of this part of the device is as follows: When the latch K is disengaged from the arm H, which is usually done by an upward kick against the arm k' from the foot of the operator, the weight of the machine throws the wheels and arm H backward, and the hoes sink into the ground. When it is desired to remove the hoes from and hold them above the ground, for the purpose of transportation or to turn the machine at the end of the rows, the machine is lifted by the handles, and the wheels fall by their own weight beneath the frame, where they are automatically locked, as before described, by the latch K.

Having thus described my invention, what I claim as new, and desire to secure by Letters Patent, is—

1. The combination, with the frame of a grain-drill, of a depending arm pivoted thereto, having shoulders upon its rear face, a wheel or wheels mounted upon its free end, a latch pivoted to said frame, and means for holding said latch in constant contact with said arm, for the purpose specified.

2. In a grain-drill, the combination, with the grain-drill frame, of a depending arm pivoted thereto, having a wheel or wheels mounted upon its free end, and having shoulders projecting from its rear face, one or more of which shoulders are vertically adjustable, and a latch pivoted to the grain-drill frame and adapted to engage with said shoulders, for the purpose specified.

3. In a grain-drill, the combination, with the frame thereof, of a depending arm pivoted thereto, having a wheel or wheels mounted upon its free end, and having shoulders upon its rear face, and a latch consisting of a bent lever pivoted at its angle to the drill-frame, and having its lower end adapted to engage with said shoulders, and having its other arm weighted, substantially as and for the purpose specified.

4. The combination, with the frame of a grain-drill, of a depending arm pivoted thereto, consisting of two bars lying parallel to each other, a wheel or wheels mounted upon the free end of said arm, and a slotted piece bolted between said parallel bars, having a rearwardly-projecting shoulder, substantially as and for the purpose set forth.

5. The combination, with the frame of a grain-drill and hoe-bearing side wings pivoted thereto, of handles loosely connected with said wings, and devices rigidly attached to said frame, which act as fulcrums, and serve to guide and support said handles, for the purpose specified.

6. The combination, with the frame of a grain-drill, of hoe-bearing side wings pivoted thereto, handles loosely connected with said wings, and stationary guides for said handles, for the purpose specified.

7. The combination of the grain-drill frame, and hoe-bearing side wings pivoted thereto, with handles loosely connected with said wings, stationary guides for said handles, and means for locking said wings at any point in their movement, substantially as and for the purpose set forth.

8. The combination, with the grain-drill frame and hoe-bearing side wings pivoted thereto, and means for swinging said wings upon their pivots, of a curved bar having notches upon its face, latches pivotally connected with said side wings and adapted to engage with said notches, and means for releasing said latches, substantially as and for the purpose specified.

9. The combination of the grain-drill frame, and hoe-bearing side wings pivoted thereto, with a curved arm secured to said frame, rings upon the outer ends of said arm, and the handles which pass through said rings and are loosely connected with said wings, substantially as and for the purpose set forth.

STACY B. HART.

Witnesses:
E. L. THURSTON,
L. HILL.